United States Patent
Gollier et al.

(10) Patent No.: US 11,054,622 B1
(45) Date of Patent: Jul. 6, 2021

(54) FOLDED VIEWING OPTICS WITH AN OPTICAL RETARDER ON A SIMPLE SURFACE

(71) Applicant: Facebook Technologies, LLC, Menlo Park, CA (US)

(72) Inventors: Jacques Gollier, Redmond, WA (US); Ying Geng, Bellevue, WA (US); Yusufu Njoni Bamaxam Sulai, Bothell, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 409 days.

(21) Appl. No.: 15/946,685

(22) Filed: Apr. 5, 2018

Related U.S. Application Data

(60) Provisional application No. 62/588,847, filed on Nov. 20, 2017.

(51) Int. Cl.
*G02B 17/08* (2006.01)
*G02B 27/28* (2006.01)

(52) U.S. Cl.
CPC ....... *G02B 17/0856* (2013.01); *G02B 27/286* (2013.01)

(58) Field of Classification Search
None
See application file for complete search history.

(56) References Cited

U.S. PATENT DOCUMENTS

| | | | |
|---|---|---|---|
| 4,526,442 A | 7/1985 | Betensky | |
| 5,541,745 A | 7/1996 | Fergason | |
| 5,715,023 A | 2/1998 | Hoppe | |
| 5,966,242 A | 10/1999 | Yamanaka | |
| 6,266,194 B1 | 7/2001 | Tanijiri et al. | |
| 6,271,969 B1 | 8/2001 | Mertz | |
| 6,400,493 B1 | 6/2002 | Mertz et al. | |
| 6,421,183 B1 | 7/2002 | Ophey | |
| 6,710,928 B2 | 3/2004 | Roest | |
| 7,206,134 B2 | 4/2007 | Weissman et al. | |
| 7,570,427 B2 | 8/2009 | Hasman | |
| 8,009,349 B2 | 8/2011 | McDowall et al. | |
| 9,555,589 B1 | 1/2017 | Ambur et al. | |
| 9,829,616 B2 * | 11/2017 | Yun | B29C 45/14 |
| 9,898,091 B2 | 2/2018 | Bristol et al. | |
| 9,977,246 B2 | 5/2018 | Ouderkirk et al. | |
| 10,025,060 B2 | 7/2018 | Lanman et al. | |
| 10,197,802 B2 | 2/2019 | Hoppe | |
| 10,394,040 B2 * | 8/2019 | Gollier | G02B 5/3083 |
| 10,416,461 B2 * | 9/2019 | Gollier | G02B 17/086 |
| 10,429,656 B1 * | 10/2019 | Sharma | G06T 7/0012 |
| 10,429,657 B1 * | 10/2019 | Sharma | G06F 3/013 |

(Continued)

OTHER PUBLICATIONS

U.S. Appl. No. 16/104,453, "Non-Final Office Action", dated Feb. 28, 2020, 13 pages.

*Primary Examiner* — Derek S. Chapel

(74) *Attorney, Agent, or Firm* — Weaver Austin Villeneuve & Sampson LLP

(57) ABSTRACT

A folded-lens system is used in an artificial-reality headset. The folded-lens system has a first mirror, a second mirror, and a quarter-wave plate between the first mirror and the second mirror. The first mirror and the second mirror are not strongly curved, which enables the quarter-wave plate to be on a flat surface.

20 Claims, 6 Drawing Sheets

(5 of 6 Drawing Sheet(s) Filed in Color)

(56) References Cited

U.S. PATENT DOCUMENTS

| | | | |
|---|---|---|---|
| 10,429,927 B1* | 10/2019 | Sharma | G06F 3/012 |
| 2005/0111101 A1 | 5/2005 | Dike | |
| 2006/0232862 A1 | 10/2006 | Steven et al. | |
| 2007/0273970 A1 | 11/2007 | Hoppe et al. | |
| 2009/0290079 A1 | 11/2009 | Evans et al. | |
| 2010/0177113 A1 | 7/2010 | Gay et al. | |
| 2011/0193814 A1 | 8/2011 | Gay et al. | |
| 2015/0103151 A1 | 4/2015 | Carls et al. | |
| 2016/0210782 A1 | 7/2016 | Thomas | |
| 2017/0227770 A1* | 8/2017 | Carollo | G02B 27/0025 |
| 2017/0276912 A1 | 9/2017 | Yao et al. | |
| 2018/0039052 A1* | 2/2018 | Khan | G02B 27/0172 |
| 2018/0113310 A1 | 4/2018 | Rolland et al. | |
| 2018/0120579 A1* | 5/2018 | Gollier | G02B 3/06 |
| 2019/0243147 A1 | 8/2019 | Smithwick et al. | |
| 2019/0384070 A1* | 12/2019 | Geng | G02B 5/3083 |
| 2020/0284963 A1* | 9/2020 | Yun | G02B 5/3083 |

* cited by examiner

FOLDED VIEWING OPTICS WITH AN OPTICAL RETARDER ON A SIMPLE SURFACE

CROSS-REFERENCES TO RELATED APPLICATIONS

This application claims priority to U.S. Provisional Patent Application No. 62/588,847, filed on Nov. 20, 2017, the disclosure of which is incorporated by reference in its entirety for all purposes.

BACKGROUND

Artificial reality is a form of reality that has been adjusted in some manner before presentation to a user, which may include, e.g., virtual reality (VR), augmented reality (AR), mixed reality (MR), hybrid reality, or some combination and/or derivatives thereof. In a virtual reality (VR) system, a near eye display panel can be configured to present virtual reality images that depict objects in a virtual environment. The display panel may combine real objects with virtual objects, as in AR or MR applications.

In a folded-optics system, an optical beam is bent to make an optical path of the optical beam longer than a length of the folded-optics system.

SUMMARY

The present disclosure relates generally to folded optics. More specifically, and without limitation, this disclosure relates to folded optics in virtual reality, augmented reality, and/or mixed reality systems. A lens system is designed to use polarization of light and reflective optical power to create a folded lens system. In some embodiments, the folded-lens system has a focal length equal to or greater than 20 mm and equal to or less than 30 mm; a field of view that is greater than +/−45 degrees horizontal; a field of view that is less than +/−110 degrees horizontal; a z-distance that is equal to or less than 22, 20, 18, or 16 mm; a z-distance that is equal to or greater than 5, 7, or 10 mm; a display size that is equal to or greater than 1.8 inches diagonal and equal to or less than 3 inches diagonal; a reflective polarizer on a compound curved surface; two quarter-wave plates; two-quarter wave plates that are identical and clocked by 90 degrees, +/−5, 10, or 15 degrees (e.g., self-compensating); and/or an absorptive polarizer (e.g., to reduce or eliminate *Narcissus* effect). In some embodiments, this disclosure describes conditions that are used to meet compact design requirements and performance compromise.

Folded optics can achieve compact designs with a large field of view (FOV) in the VR space. However, as designers try to push the limit of the form factor, they make some performance trade-offs in term of FOV, optical quality, and image contrast/ghosting. Folded optics are reflective optical designs that can result in very compact VR headset. In some embodiments, two reflective surfaces are used, which have most of the focusing optical power.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Illustrative embodiments are described with reference to the following figures.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive.

Figure 1:
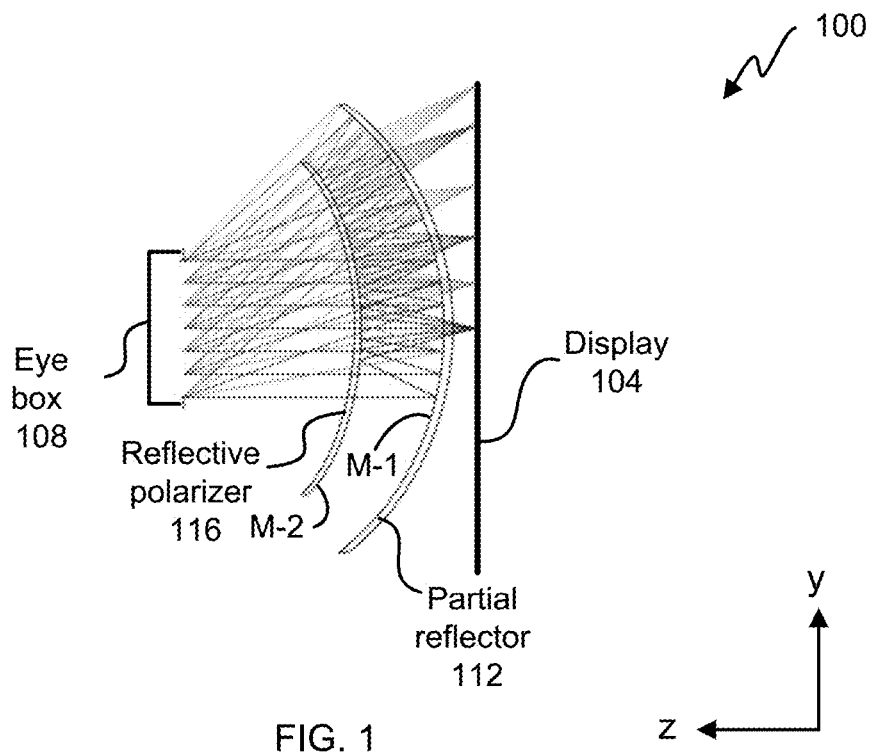
FIG. 1 depicts an embodiment of a folded-lens system.

FIG. 1 shows an embodiment of a folded-lens system 100 comprising a first mirror M-1 and a second mirror M-2. Light from a display 104 is focused to an eye box 108 using the first mirror M-1 and the second mirror M-2. The first mirror M-1 is a partial reflector 112. The partial reflector 112 has a transmission T, wherein T is equal to or greater than 20% or 40% and equal to or less than 60% or 80% (e.g., a 50/50 mirror with T=50%+/−2, 5, or 10%). The second mirror M-2 is a reflective polarizer 116. Not shown is a quarter-wave plate between the first mirror M-1 and the second mirror M-2. Light emitted from the display 104 is transmitted by the partial reflector 112 (e.g., half the light is transmitted through the partial reflector 112); reflects off the second mirror M-2; reflects off the first mirror M-1; and then is transmitted through the reflective polarizer 116 to the eye box 108.

Figure 2:
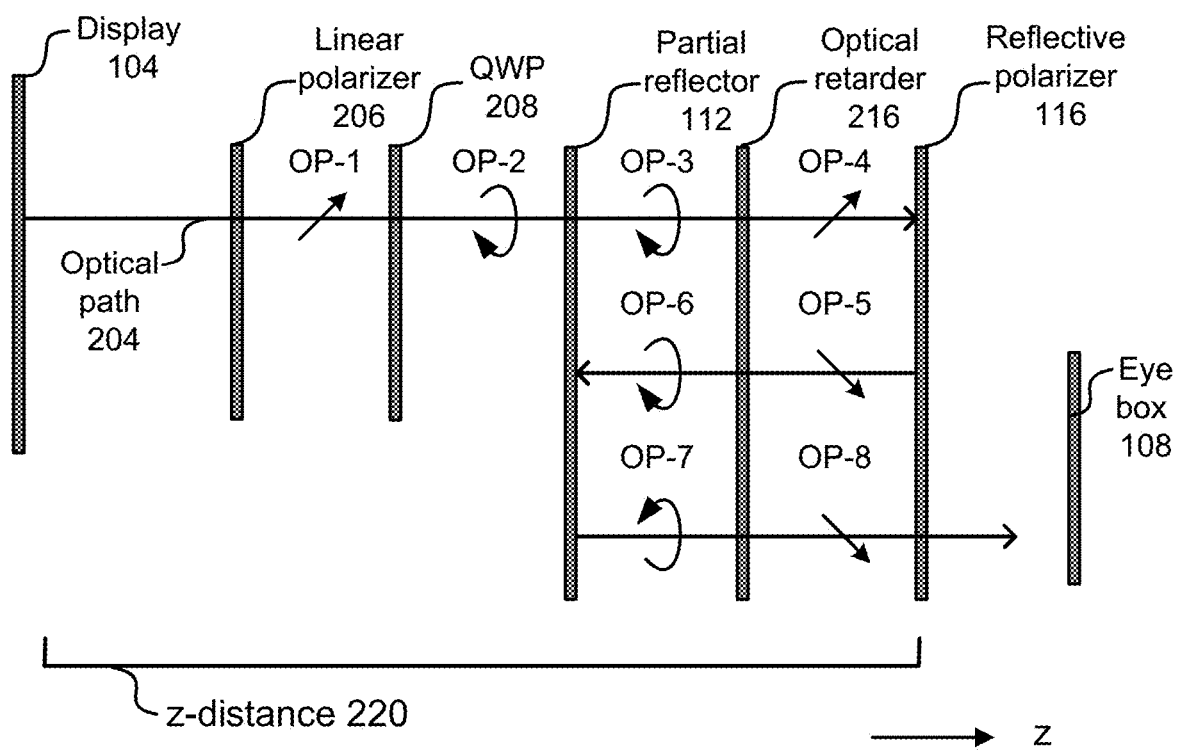
FIG. 2 illustrates an embodiment of light polarizations in a folded-lens system.

FIG. 2 illustrates an embodiment of light polarizations in a folded-lens system. Light from the display 104 travels along an optical path (OP) 204 to the eye box 108. Light at a first portion OP-1 of the optical path 204 is linear polarized after transmitting from the display 104 through a linear polarizer 206 (e.g., an absorptive polarizer). For example, the light is polarized at 45 degrees with respect to an x axis in an x/y plane, wherein the z axis is a direction of light propagation. Light passes through a quarter-wave plate (QWP) 208 and is circularly polarized along a second portion OP-2 of the optical path 204. For example, a fast axis of the QWP is aligned along a y axis (90 degrees with respect to the x axis) and the light is left-handed circularly polarized.

After transmitting through the quarter-wave plate 208, light passes through the partial reflector 112. After passing through the partial reflector 112, polarization of light doesn't change along a third portion OP-3 of the optical path 204. Light passing through an optical retarder 216 is changed to linearly-polarized light (e.g., 45 degrees) at a fourth portion OP-4 of the optical path 204. For example, the QWP 208 is a first quarter-wave plate and the optical retarder 216 is a second quarter-wave plate clocked by 90 degrees from the QWP 208.

Light from the fourth portion OP-4 of the optical path 204 reflects off the reflective polarizer 116 because the reflective polarizer 116 passes light at 135 degrees and reflects light at 45 degrees. Reflected light from the fourth portion OP-4 of the optical path 204 becomes linearly polarized at 135 degrees at a fifth portion OP-5 of the optical path 204 because the electric field remains constant in x/y/z coordinates yet the direction of beam propagation is flipped. Light then passes through the optical retarder 216 a second time and is circularly polarized (e.g., left handed) at a sixth portion OP-6 of the optical path 204. Light from the sixth portion OP-6 of the optical path 204 is reflected (e.g., 50% reflected) and becomes oppositely circularly polarized at a seventh portion OP-7 of the optical path 204 (e.g., right-handed). After passing through the optical retarder 216 a third time, light is linearly polarized at an eighth portion OP-8 of the optical path 204, but in an orientation orthogonal (e.g., 135 degrees) to light at the fourth portion OP-4 of the optical path 204. Light from the eighth portion OP-8 of the optical path 204 is transmitted through the reflective polarizer 116 to the eye box 108.

Due to a double bounce in the cavity between the first mirror M-1 and the second M-2, a total length of the system can be reduced. A z-distance 220 is measured from the second mirror M-2 or the reflective polarizer 116 to the display 104. Also, a use of reflective surfaces allows a decrease in the F-number resulting in shorter focal length, which means that a smaller sized display can be used while maintaining a size of the eye box 108 and/or a field of view.

Figure 3:
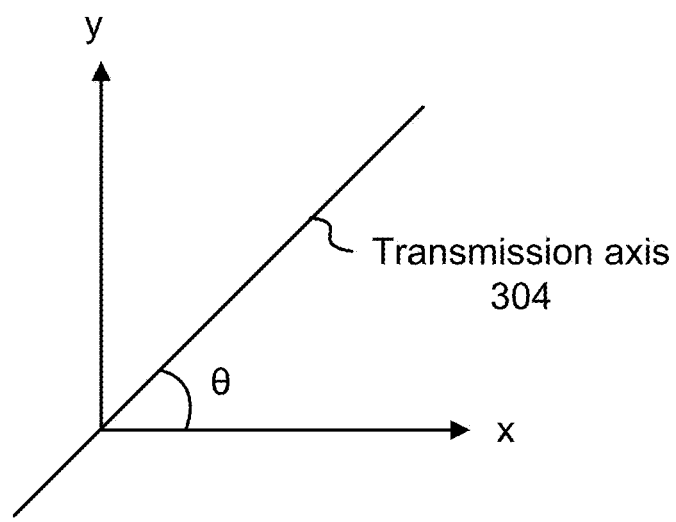
FIG. 3 depicts an embodiment of an orientation of a transmission axis of a polarizer.

In FIG. 3, a transmission axis 304 of the linear polarizer 206 is shown in relation to an x axis and y axis. The transmission axis 304 of the linear polarizer 206 is measured as an angle θ from the x axis. The fast axis of quarter-wave plate 208 is offset from the transmission axis 304 of the linear polarizer 206 by 45°+/−5, 10 or 15 degrees. The fast axis of the quarter-wave plate 208 is offset from the fast axis of the optical retarder 216 (the second quarter-wave plate) by 90 degrees+/−5, 10, or 15 degrees. For example, the angle θ for the quarter-wave plate 208 (the first quarter-wave plate) is 90°, and the angle θ for the optical retarder 216 (the second quarter-wave plate) is 0°.

In some embodiments, the reflective polarizer 116 (the second mirror M-2) and/or the optical retarder 216 are laminated on a flat surface to reduce manufacturing complexity of the reflective polarizer 116 and/or the optical retarder 216. Manufacturing complexity is reduced because a lens design does not require laminating of polarization films on a compound curved surface. However, an amount of degrees of freedom are limited because most optical power is generated by the first mirror M-1. Consequently, the Petzval sum of the system is dominated by a surface of the first mirror M-1, which makes field curvature and astigmatism hard to compensate for. Ways to compensate for field curvature generated by the first mirror M-1 include having a strong positive refractive power element, adding a field lens, and/or having a convex-curved fiber-optics face plate on the display 104. These can result in solutions that are still relatively bulky and/or have limited optical quality, which might not be optimal for glasses having a small form factor.

Figure 4:
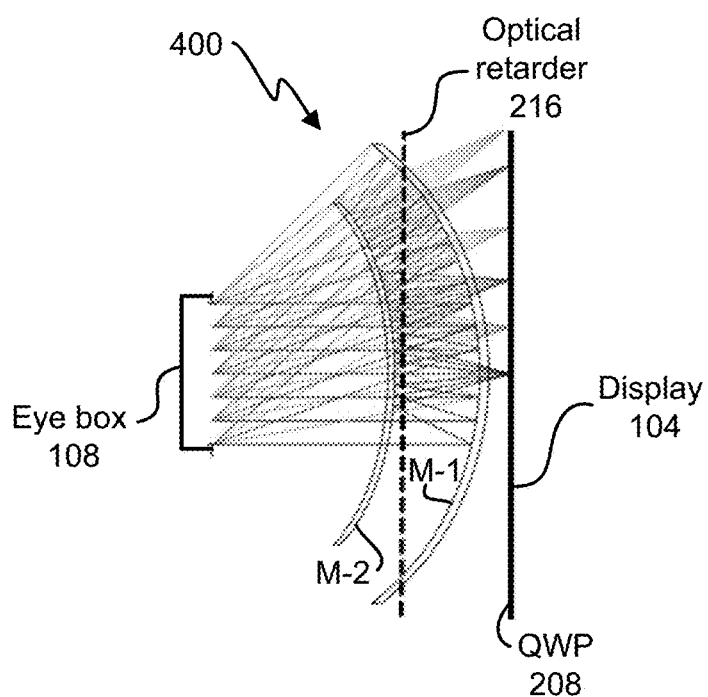
FIG. 4 depicts an embodiment of a folded-lens system with highly curved surfaces.

FIG. 4 depicts an embodiment of a lens system 400 with a first mirror M-1 and a second Mirror M-2 having highly curved surfaces. Light from the display 104 is circularly polarized (e.g., light from the display is linearly polarized, such as by an LCD screen, and the quarter-wave plate 208 is placed over the display 104). In this embodiment, the first mirror M-1 and the second mirror M-2 have similar radii of curvatures. Since both the first mirror M-1 and the second mirror M-2 have similar radii of curvatures, the Petzval sum is close to zero, which reduces or solves field aberrations such as field curvature and astigmatism. This type of design, being close to monocentric, minimizes field aberrations. From a pure optics point of view, these types of designs are usually the most compact and can reach very wide FOVs.

A potential problem, however, is that the first mirror M-1 and the second mirror M-2 are so curved and close together that there is no room to put an optical retarder 216, which is flat, inside the cavity between the first mirror M-1 and the second mirror M-2. Thus the optical retarder 216 has some compound curvature to fit between the first mirror M-1 and the second mirror M-2. Curved quarter-wave plates have been developed in the past by using, for instance, spin coated liquid crystal polymer layers. However, manufacturing processes still have yet to be demonstrated and/or reduced in cost.

Figure 5:
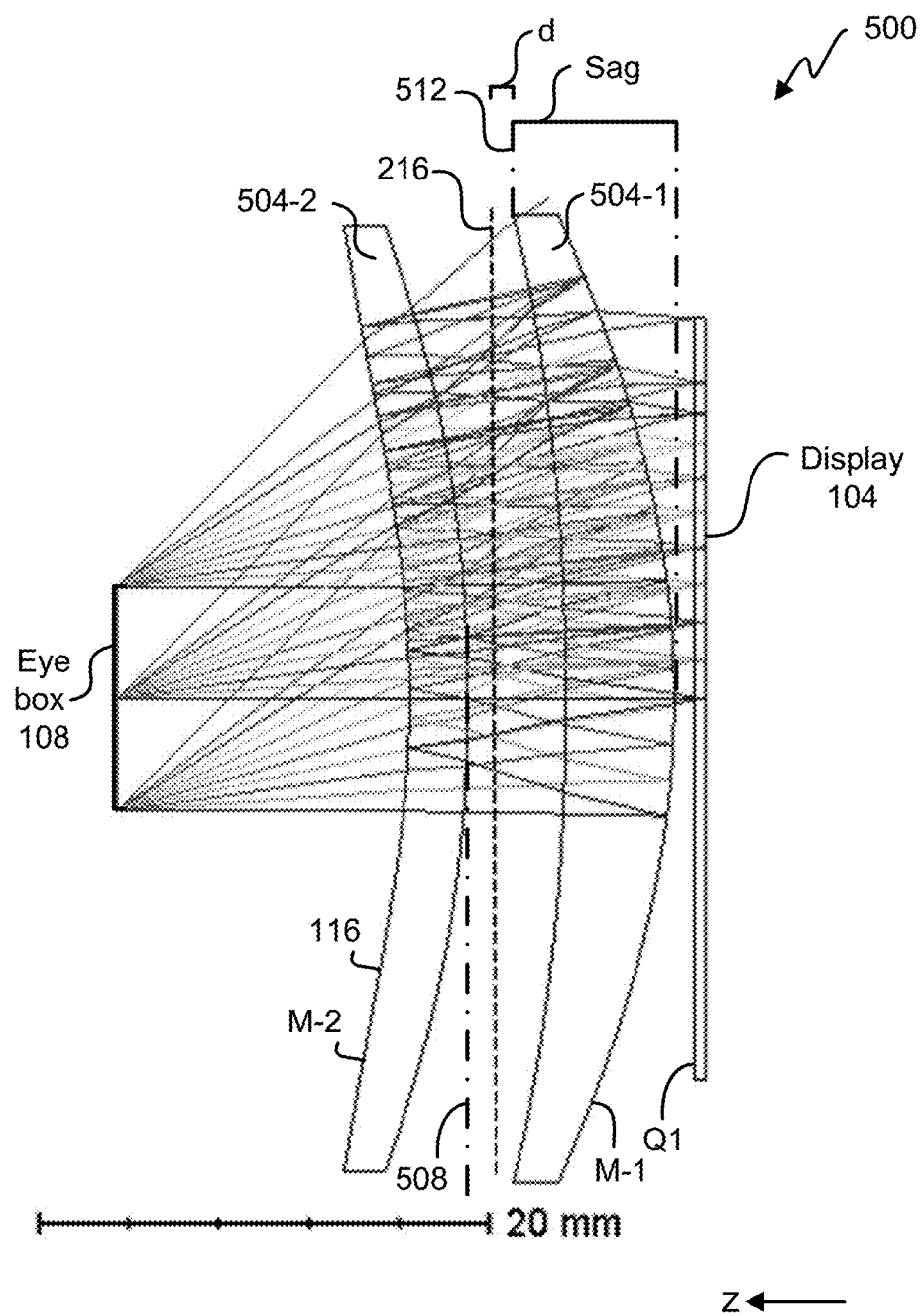
FIG. 5 depicts an embodiment of a folded-lens system with a flat optical retarder.

FIG. 5 depicts an embodiment of a folded-lens system 500 comprising reflective polarizer 116 that is curved and an optical retarder 216 that is flat. The folded-lens system 500 comprises a first lens 504-1, a second lens 504-2, and an optical retarder 216. A first mirror M-1 is part of the first lens 504-1. The first mirror M-1 is a partial reflector 112. A second mirror M-2 is part of the second lens 504-2. The second mirror M-2 is a reflective polarizer 116. The optical retarder 216 is a quarter-wave plate. The optical retarder 216 is flat. The optical retarder 216 is between the first mirror M-1 and the second mirror M-2.

Curves of the first mirror M-1 and the second mirror M-2 are less aggressive so that there is room for the optical retarder 216 on a simple surface (e.g., a planar surface or a simple curved surface) between the first mirror M-1 and the second mirror M-2. Sag for a lens 504 is measured from a front surface of the lens 504 to a back edge of the lens 504. For the design in FIG. 5, the sag-to-diameter ratio for the first mirror M-1 is equal to or less than 0.2, 0.15 and/or equal to or greater than 0.01 or 0.001. The first lens 504-1 and the second lens 504-2 are configured so that a front surface 508 of the second lens 504-2 does not extend past a back edge 512 of the first lens 504-1. The design in FIG. 5 provides a compact design without using a quarter-wave plate on a compound curved surface.

To compensate for the field curvature generated by reflection from the first mirror M-1, the second mirror M-2 is curved in a way to generate negative power, if the second mirror M-2 is curved. In other words, a center of curvature of the second mirror M-2 is on a side of the eye box 108. In some embodiments, curvature of the front surface 508 (display side) of the second lens 504-2 and/or a back surface of the first lens 504-1 is non-aggressive. If the second lens 504-2 has too strong a concave curvature, it is difficult to fit an optical retarder 216 that is flat between the first lens 504-1 and the second lens 504-2. If the second lens 504-2 is flat, or convex (e.g., curved in a similar direction as a display side of the second lens 504-2), the optical retarder 216 will fit between the back edge 512 of the first lens 504-1 and the front surface 508 of the second lens 504-2. In some embodiments, the optical retarder 216 can also be curved cylindrically to better fit between a gap between the first lens 504-1 in the second lens 504-2. To correct for a relatively large range of prescription lenses, elements are configured to be movable relative to each other (e.g., moving the first lens 504-1 only, moving the first lens 504-1 in combination with the display 104, moving the second lens 504-2, moving the first lens 504-1 in combination with the second lens 504-2, or moving the first lens 504-1 in combination with the second lens 504-2 and with the display 104). In some embodiments, a distance d between an a back edge of the first lens 504-1 and the optical retarder 216 is selected to have a minimum distance for a given optical compensation (e.g., larger than 1.5 mm to accommodate a myopic focus of −8D).

If an eye relief is in the order of 16 mm and a horizontal FOV of +/−45 degrees per eye, a minimum diameter of the second lens 504-2 is equal to or greater than 35 or 40 mm to cover the FOV. In term of materials, one parameter is birefringence introduced by a lens 504. Glass would be an option since birefringence can be very low. However, due to cost of making large diameter aspheric lenses and weight constrains, low birefringence plastic materials (e.g., acrylic, PMMA, and/or Zeonex) are used.

A potential problem, however, is that injection molded plastic parts can present stress induced birefringence. Applicant has found that in some embodiments stress induced birefringence retardance is less than 20 nm (and/or equal to or greater than zero) to keep acceptable image contrast. Additionally, an optical design in some embodiments integrates injection molding constrains to keep low birefringence. Injecting molding constrains are that a large lens edge thickness is used to have large injection gates and small center thickness is used to minimize a volume of a lens to fill. Experience shows that in some embodiments a center to edge thickness ratio is to be equal to or less than 3 or 4 and/or greater than zero.

A thermal cycling process of moving mold temperature up and down during the molding process when used in conjunction with conformal insert cooling can reduce birefringence in optical molded plastics. Conformal cooling allows for multiple thermal channels in an optical insert, wherein the molded lens solidification can be controlled to create an isothermal condition on the lens with low residual stress.

Figure 6:
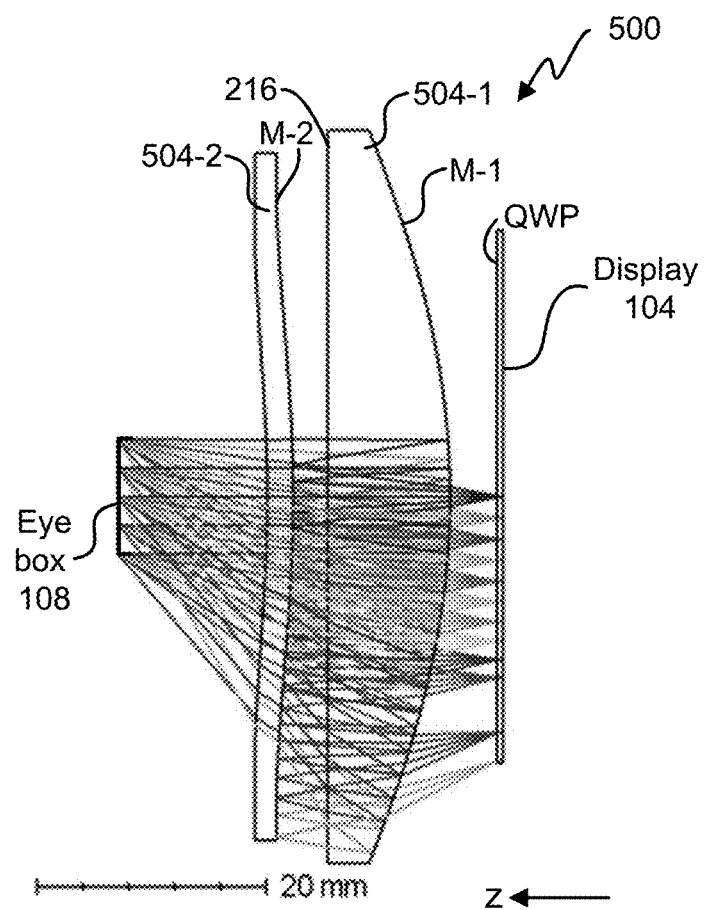
FIG. 6 depicts an embodiment of a folded-lens system with an optical retarder applied to a flat surface of a lens.

FIG. 6 is another embodiment of a folded-lens system 600. The folded-lens system 600 comprises a first lens 504-1 that is a plano-convex lens. The folded-lens system 600 comprises a second mirror M-2, which is a reflective polarizer 116 on a compound curved surface. The second lens 504-2 has a center of curvature located on the side of eye box 108. An optical retarder 216 is between the first lens 504-1 and the second lens 504-2. In some embodiments, the optical retarder 216 is disposed on a planar side of the first lens 504-1.

Figure 7:
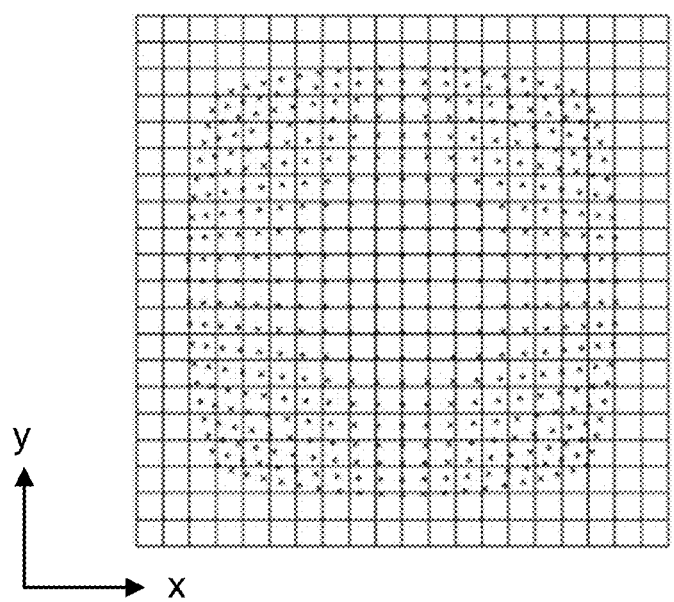
FIG. 7 illustrates an embodiment of a display showing distortion.

FIG. 7 depicts a simplified drawing of an embodiment of a display 104 as seen at the eye box 108. If we neglect, in first approximation, distortion effects, a size of the display is given by:

$$L = f \tan(FOV)$$

Where:
L is a half width of the display,
f is a focal length of the lens system, and
FOV is the half horizontal field of view of the headset.

In some embodiments, estimating a target FOV=45 degrees is a reasonable value given that 45 degrees is a typical human nasal field of view. Folded optics design optimizations shows that a smallest F-number for some embodiments (defined as the ratio between the focal length and the pupil diameter) with acceptable image quality is in the order of 2. Headsets can be designed for an eye box of 10 mm or larger because the human eye is moving while gazing in different directions and/or to compensate for variations of inter pupil distance. Thus a focal length equal to or greater than 20 mm is used in, which fixes a horizontal width of the panel to be 40 mm or greater. Assuming a square FOV, this means that a size of the display is in the order of 2.2 inches diagonal.

In reality, designs comprise image distortion due to large FOV. As shown in FIG. 7, distortion is usually of barrel shape, which allows a further decrease in display size. Design optimizations show that minimum display size is in the order of 1.8 inches diagonal to keep an eye box of 10 mm and a horizontal FOV of +/−45 degrees horizontal FOV per eye. Minimum focal length is also in the order of 20 mm. Also, minimum z-distance (distance from a lens surface facing the eye, e.g., a back surface of the second lens 504-2, to the display) is around 13 mm (e.g., 13 mm+/−2, 4, or 5 mm).

From a pure optical point of view, there is not an upper limit to focal length and display size as many designs can be scaled by a given factor (>1) while keeping its optical quality. However, while scaling up, we are losing on compactness. So in some embodiments, focal length is equal to or less than 25, 30, 35, or 40 mm; and/or display diagonal is equal to or less than 3.5, 3.0, or 2.5 inches for a compact VR system.

In some embodiments, a focal length of 24 mm, +/−3 or 6 mm; a display with a diagonal of 2.1 inches, +/−0.3, 0.6, or 0.9 inches; a FOV 45 degrees, +/−5, 10, or 15 degrees, horizontal per eye; and/or a z-distance of 13 mm, +/−1, 2, 4, or 7 mm, are used.

In optical systems, image distortion is generally considered as an aberration to be corrected. However, in VR headsets, distortion can be compensated by software by pre distorting an image. Thus distortion by lenses 504 can be a good thing since it allows a system to have a large FOV without increasing the display size too much. So, in our case, the distortion at an edge of the field is made to be as large as possible since peripheral human vision has limited resolution. However, increasing distortion has some limit since image resolution is to be kept over an angle that covers a human gazing angle. A good compromise, in some embodiments, is to keep distortion below 10% within the human gaze angle (+/−30 degrees) and make the distortion to reach at least 30% at the edge of the field.

Figure 8:
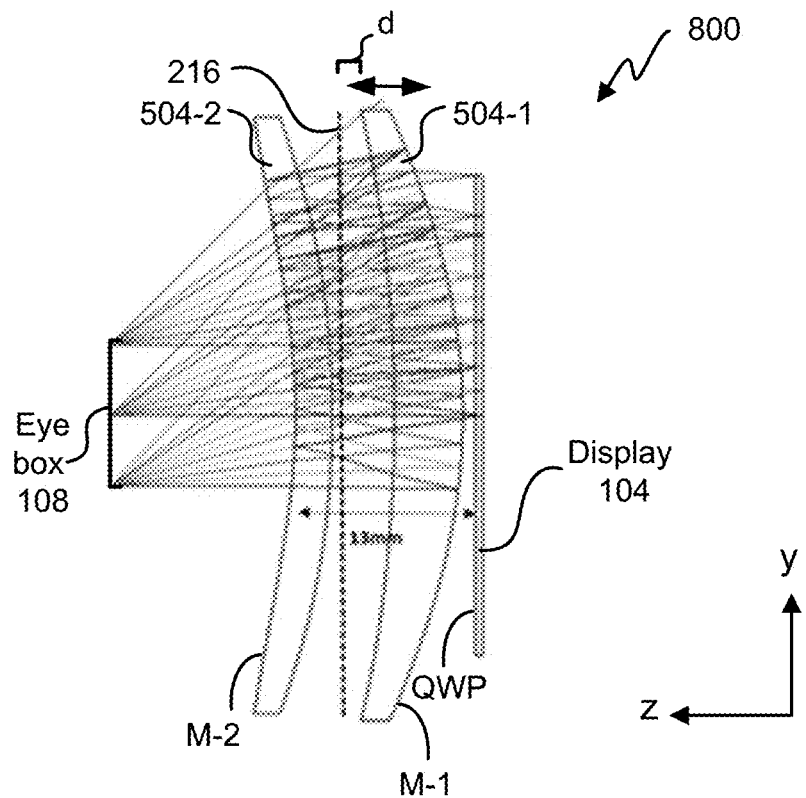
FIG. 8 depicts an embodiment of a folded-lens system with optical correction.

FIG. 8 depicts an embodiment of a folded-lens system 800 with optical correction. In some embodiments of a compact VR headset, there will be little or no room for a user to wear correction lenses. Therefore, a focus mechanism is included that allows optical compensation for users needing correction (e.g., for myopia). In compact folded optics designs, a back focal distance is usually very short, which means moving the display 104 along the z-axis limits an amount of diopters that can be compensated for since, at some point, the display 104 hits the first lens 504-1. In some embodiments, the first mirror M-1 (e.g., the first lens 504-1) is moved because an amplitude of motion used is lower than while moving the display 104. Thus, the optical design is made to have enough clearance to allow the first lens 504-1 to move without touching the display 104 on one side and without touching the optical retarder 216 (or the second lens 504-2) on another side.

One advantage of folded optics is that a translation of parts for correction is smaller compared to non-folded designs to get to a same prescription correction. For the folded-lens system 800 to compensate for −8D to 4D of prescription range, the first lens 504-1 and/or the display 104 move in by 1.7 mm and move out by 0.8 mm. Thus the distance d between the first lens 504-1 and the optical retarder 216 is larger than 1.7 mm. In some embodiments, only the first lens 504-1 is moved, and other elements are fixed, or the second lens 504-2 moves while leaving other elements fixed. In some embodiments, the first lens 504-1, the second lens 504-2, the optical retarder 216, and/or the display 104 are moved (e.g., for optical correction). It will be recognized that if the optical retarder 216 is on the first lens, then the distance d is a distance between the first lens 504-1 and the second lens 504-2.

Figure 9:
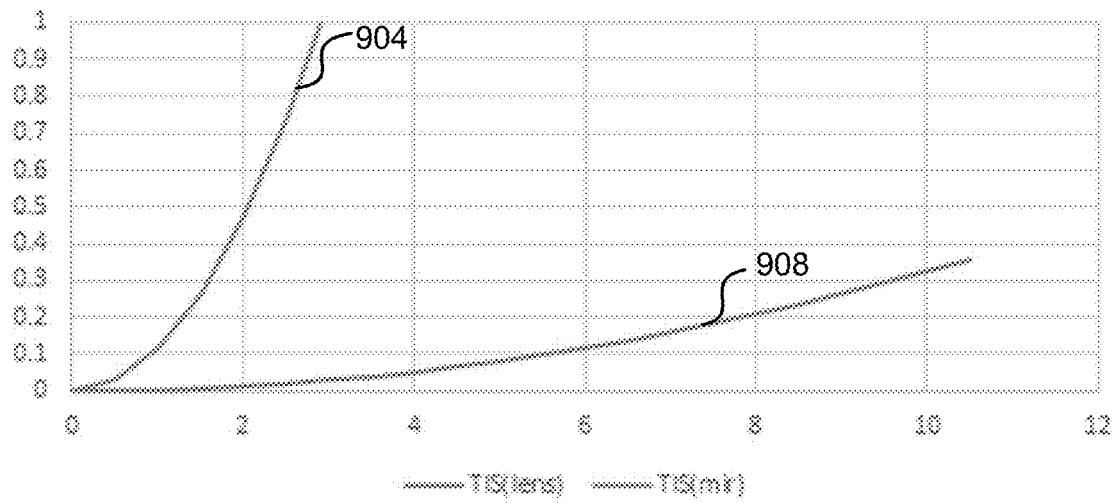
FIG. 9 illustrates a diagram of surface roughness versus scatting for a lens and a partially-reflective lens.

In some embodiments, custom prescription inserts are used in combination with, or in lieu of, adjusting the first mirror M-1, the second mirror M-2, and/or the display 104. An advantage to not moving the first mirror M-1 and or the second mirror M-2 is that you get rid of moving parts, can correct for astigmatism, and/or the design can potentially have better optical quality. A drawback is that prescription inserts add a level-of-entry barrier and/or make it hard for people to share the same headset. In some embodiments, moving optical elements provide a compensating range (e.g., a range of 4 or 6 diopter correction) and replacement lenses are used to correct to a general range. For example, with standard lenses, the headset could adjust from −4D to 1D. With a first replacement lens, the headset could adjust from −8D to −3D. With a second replacement lens, the headset could adjust from 0D to 5D, etc. the FIG. 9 illustrates a diagram of surface roughness versus scatting for a lens and a partially-reflective lens. Injection molded parts use an insert to replicate a surface shape. The insert is made by using diamond turning, which can usually achieve roughness quality in the order of 5-10 nm. This level of roughness is usually okay for conventional lenses, but it is usually not good enough for reflective systems. An amount of scattered light is proportional to the square of the index contrast. For a conventional lens, index contrast is about 0.5 while, in internal reflection systems, such as the partial reflector 112, the index contrast is 3. That means that roughness, in some embodiments, is to be about 6 times better than for conventional lenses.

FIG. 9 is a plot of integral scattered power (reflected light over scattered light) respectively for an internal reflection mirror (e.g., for the partial reflector 112) and for a refractive surface. A first plot 904 shows integral scattered power for the internal reflection mirror. A second plot 908 shows integral scattered power for the refractive surface. It shows that for an internal reflective surface, roughness could be <3 nm to get below 1% of scattering. TIS is total integrated scatter from surfaces. Single point diamond turning is capable of sub 2 nm Ra on properly finished NiP plated inserts. In addition, MRF (Magneto Rheological Finishing) can also be used as a secondary process to finish mold inserts to <1 nm Ra. In some embodiments, roughness for lenses 504 is equal to or less than 3 or 2 nm and/or greater than 0.1 or 0.5 nm.

Figure 10:
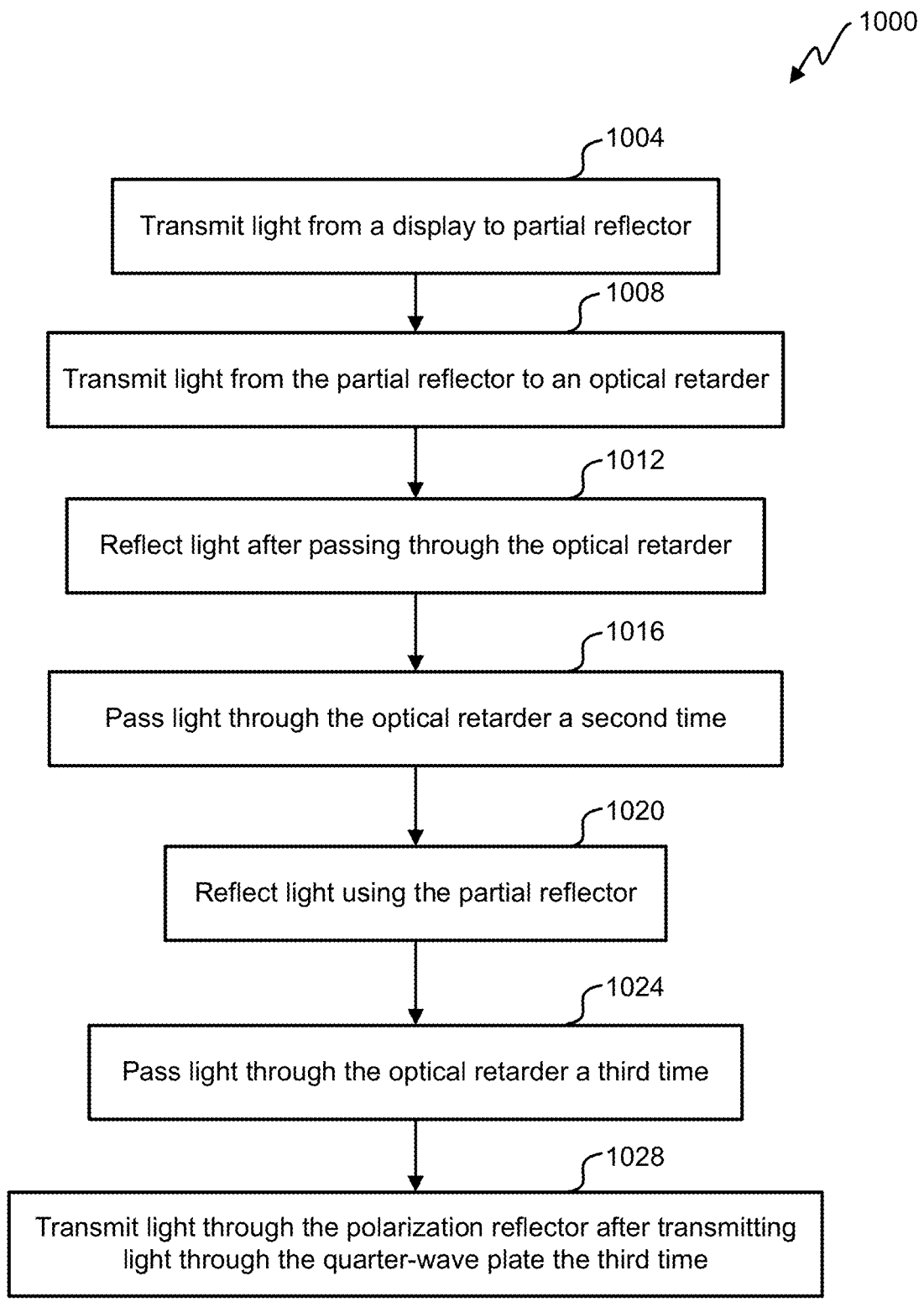
FIG. 10 illustrates an embodiment of a flowchart of a process for using a folded lens in an artificial-reality system.

FIG. 10 illustrates an embodiment of a flowchart of a process 1000 for using a folded lens in a VR system. Process 1000 begins in step 1004 with transmitting light from a display (e.g., display 104) to a partial reflector (e.g., partial reflector 112). The partial reflector can be on a compound curved surface. In step 1008, light is transmitted from the partial reflector to a quarter-wave plate (e.g., optical retarder 216, which can be a quarter-wave plate). In some embodiments, the optical retarder 216 in on a simple surface (e.g., a flat surface or a cylindrical surface). In step 1012, light is reflected after passing through optical retarder (e.g., reflected by the second mirror M-2, which could be a reflective polarizer 116) in step 1016, light is passed through the optical retarder a second time. Light is then reflected from the partial reflector, step 1020. Light is passed through the optical retarder a third time, after reflecting from the partial reflector, step 1024. In step 1028, light is transmitted through the polarization reflector after transmitting light through the optical retarder the third time because polarization of the light changed from reflecting (e.g., in step 1012) to passing at the polarized reflector.

In some embodiments, the system has a field of view of plus and minus 45 degrees horizontal for an eye-relief on 14 mm; FOV is defined as the chief ray from the eye hitting an edge of the lens and edge of the display; equal to or less than 15 mm z-distance from the second lens 504-2 to the display 10 and/or equal to or greater than 7, 9, 10, or 11 mm; and/or the display 104 is from 2.0"-2.5" diagonal.

In some embodiments, a quarter-wave plate is designed for a specific wavelength and is within 3%, 4%, and/or 5% of that wavelength for the quarter-wave plate (e.g., for 650 nm light, a quarter-wave retarder would be 162.5 nm thick+/−19.5 nm, 26 nm, and/or 32.5 nm).

In some embodiments, an optics system has one or more of the following:
  horizontal FOV is greater than +/−45 degrees horizontal per eye, and/or less than +/−90 degrees horizontal per eye;
  focal length is 20 to 30 mm;
  display size is 1.8 to 3 inch diagonal;
  z-distance equal to or less than 21 mm and/or equal to or greater than 10 mm;
  enough clearance to generate prescription correction from −4D to +2D;
  is made of two separated elements (e.g., the first lens 504-1 and the second lens 504-2) so to allow one to move with respect to the other;
  lenses (e.g., lenses 504) are injection molded plastic parts;
  lenses have optical retardance due to injection molding equal to or less than 20 nm (e.g., not including an optical retardance coating for a quarter-wave plate);
  lenses have center/edge ratio equal to or less than 4 or 3 and or equal to or greater than zero or 1;
  the first mirror M-1 has a surface roughness equal to or less than 3 nm RMS; and/or
  a lens system that includes a linear polarizer, a quarter-wave plate (QWP 208), a partial reflector 112, an optical retarder 216, and/or a reflective polarizer 116; wherein the QWP 208 and the reflective polarizer 116 have transmission axes oriented at 90 degrees with respect to each other; and/or the QWP 208 and the optical retarder 216 have fast axes that are oriented at 90 degrees with respect to each other.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system comprising:
    a display, wherein the display is an optical display emitting light;
    a first lens, the first lens comprising a first reflective surface facing the display;
    a second lens, the second lens comprising a second reflective surface facing a user's eye, wherein:
        the first lens is between the second lens and the display; and
        a z-distance from the second reflective surface to the display is equal to or less than 15 mm and is equal to or greater than 5 mm; and
    a flat optical retarder between the first lens and the second lens.

2. The system of claim 1, wherein the flat optical retarder is on a simple surface.

3. The system of claim 1, wherein the flat optical retarder is a quarter-wave retarder.

4. The system of claim 1, further comprising a linear polarizer and a quarter-wave plate.

5. The system of claim 1, wherein the first reflective surface is a partial mirror.

6. The system of claim 5, wherein the partial mirror has a transmission of 50%+/−10%.

7. The system of claim 1, wherein the second reflective surface comprises a reflective polarizer.

8. The system of claim 1, wherein:
    the display has a diagonal length, and the diagonal length is equal to or greater than 1.8 inches and equal to or less than 3 inches; and
    the flat optical retarder is characterized by a diameter or a diagonal length greater than the diagonal length of the display.

9. The system of claim 1, wherein the first lens has a surface roughness less than 3 nm.

10. The system of claim 1, wherein the first lens is configured to move to compensate for optical vision of a user.

11. The system of claim 1, wherein the system has a focal length equal to or greater than 20 mm and equal to or less than 30 mm.

12. The system of claim 1, wherein a sag-to-diameter ratio for the first lens is equal to or less than 0.15.

13. The system of claim 1, wherein the first reflective surface and the second reflective surface are curved surfaces.

14. A lens system, the lens system comprising:
    a first lens, wherein the first lens has a partial reflector on a compound curved surface facing a display;
    a second lens having a reflective surface facing an eye of a user of the lens system; and
    flat optical retarder, wherein:
the flat optical retarder is between the first lens and the second lens;
the first lens is between the second lens and the display; and
the lens system has:
a focal length equal to or greater than 20 mm and equal to or less than 30 mm;
a field of view that is greater than +/−45 degrees in a horizontal plane;
a z-distance that is equal to or less than 15 mm and equal to or greater than 5 mm from the reflective surface of the second lens to the display; and
a size of the display equal to or greater than 1.8 inches diagonal and equal to or less than 3 inches diagonal.

15. The lens system of claim 14, wherein the flat optical retarder is within 26 nm of a quarter wavelength of a peak emission of a light in the display.

16. The lens system of claim 14, further comprising a quarter-wave plate, wherein the quarter-wave plate and the flat optical retarder are identical and clocked by 90 degrees, +1-5 degrees.

17. The lens system of claim 14, wherein the reflective surface of the second lens comprises a reflective polarizer.

18. A method comprising:
transmitting light from a display to a partial reflector on a first surface of a first lens, the first surface facing the display;
transmitting light from the partial reflector to a flat quarter-wave plate;
reflecting light passing through the flat quarter-wave plate by a polarization reflector on a second surface of a second lens, the second surface facing a user's eye, wherein a z-distance from the second surface of the second lens to the display is equal to or less than 15 mm and is equal to or greater than 5 mm;
transmitting light through the flat quarter-wave plate a second time;
reflecting light using the partial reflector;
passing light through the flat quarter-wave plate a third time; and
transmitting light through the polarization reflector after transmitting light through the flat quarter-wave plate the third time.

19. The method of claim 18, further comprising moving the first lens in relation to the second lens for vision correction.

20. The method of claim 19, wherein the first lens is moved no more than 2.5 mm to compensate for −8 to +4 diopter prescriptions.

* * * * *